(12) United States Patent
De Villiers et al.

(10) Patent No.: US 9,330,463 B2
(45) Date of Patent: May 3, 2016

(54) METHOD OF CALIBRATING A CAMERA AND A SYSTEM THEREFOR

(71) Applicant: CSIR, Brummeria, Pretoria (ZA)

(72) Inventors: Jason Peter De Villiers, Centurion (ZA); Jaco Cronje, Zawavelpoort (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 14/002,195

(22) PCT Filed: Nov. 29, 2012

(86) PCT No.: PCT/IB2012/056820
§ 371 (c)(1),
(2) Date: Aug. 29, 2013

(87) PCT Pub. No.: WO2014/083386
PCT Pub. Date: Jun. 5, 2014

(65) Prior Publication Data
US 2015/0287196 A1 Oct. 8, 2015

(51) Int. Cl.
*G06K 9/00* (2006.01)
*G06T 7/00* (2006.01)
*H04N 5/232* (2006.01)
*H04N 17/00* (2006.01)

(52) U.S. Cl.
CPC .......... *G06T 7/0018* (2013.01); *H04N 5/23241* (2013.01); *H04N 17/002* (2013.01)

(58) Field of Classification Search
CPC . G06T 7/0018; H04N 17/002; H04N 5/23241
USPC ........................................................ 382/153
See application file for complete search history.

(56) References Cited

U.S. PATENT DOCUMENTS

2004/0172164 A1* 9/2004 Habibi ................... B25J 9/1692
700/245
2009/0028423 A1 1/2009 Sandstrom et al.

OTHER PUBLICATIONS

Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358.

(Continued)

*Primary Examiner* — Manuchehr Rahmjoo
(74) *Attorney, Agent, or Firm* — Nixon Peabody LLP; Jeffrey L. Costellia

(57) ABSTRACT

A system and method for calibrating a camera includes an energy source and a camera to be calibrated, with at least one of the energy source and the camera being mounted on a mechanical actuator so that it is movable relative to the other. A processor is connected to the energy source, the mechanical actuator and the camera and is programmed to control the mechanical actuator to move at least one of the energy source and the camera relative to the other through a plurality of discrete points on a calibration target pattern. The processor further, at each of the discrete points, controls the camera to take a digital image and perform a lens distortion characterization on each image. A focal length of the camera is determined including any lens connected to the camera and an extrinsic camera position for each image is then determined.

18 Claims, 2 Drawing Sheets

(56) References Cited

OTHER PUBLICATIONS

Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 323-344.

International Search Report for PCT/IB2012/056820 dated May 8, 2013.

Written Opinion for PCT/IB2012/056820 dated May 8, 2013.

* cited by examiner

METHOD OF CALIBRATING A CAMERA AND A SYSTEM THEREFOR

BACKGROUND OF THE INVENTION

The present application relates to a method of calibrating a camera and a system therefor.

The methodology firstly characterizes the lens distortion and then determines the focal length and finally determines the extrinsic positions of the cameras.

Using the above methodology, the present invention provides an improved method of calibrating a camera and a system therefor.

SUMMARY OF THE INVENTION

According to one example embodiment, a system for calibrating a camera, the system including:
  an energy source and a camera to be calibrated, with at least one of the energy source and the camera being mounted on a mechanical actuator so that it is movable relative to the other;
  a processor connected to the energy source, the mechanical actuator and the camera, the processor programmed to:
  control the mechanical actuator to move at least one of the energy source and the camera relative to the other through a plurality of discrete points on a calibration target pattern;
  at each of the discrete points, control the camera to take a digital image;
  perform a lens distortion characterisation on each image;
  determine a focal length of the camera including any lens connected to the camera; and
  determine an extrinsic camera position for each image.

The processor may perform the lens distortion characterisation by:
  choosing a distortion correction model and determine an initial estimate of parameters for this model to correct an observed distortion;
  choosing a line straightness metric, which measures and quantifies co-linear points along a sampled line; and
  using the line straightness metric and numerically refining the initial estimated parameters until the lines in the distortion corrected image.

The processor may determine a focal length by:
  selecting an initial focal length;
  using algorithms in combination with the initial focal length, physical pixel sizes, undistorted image coordinates of the energy source at each point in the sequence, and the exact positions of the mechanical actuator at each point in the sequence to determine the position of the camera relative to each discrete point;
  determine how tightly clustered the camera positions are; and
  numerically refine the initial focal length until the determined discrete points are most tightly packed.

The processor may determine an extrinsic camera position by:
  creating a bundle of geometry based vectors; creating a bundle of image processing based vectors;
  choosing a metric to measure the similarity of the two bundles of vectors; and
  refine an estimated position of the camera relative to the energy source to maximise the similarity of the bundles of vectors.

In one example, after the digital images have been captured, the processor further performs the following imaging processing steps:
  determine which regions of adjacent pixels in an image have an intensity above a chosen threshold value;
  generate a list of such regions and the pixels which belong to each region together with the pixels' coordinates and intensities;
  remove from this list any regions which have either too few or too many constituent pixels as determined by characteristics of the camera, lens and energy source;
  remove from the list all regions that do not meet shape criteria; and
  determine a center of the largest remaining region.

The processor may determine the center by fitting an ellipse to the region's pixel and using its center or by calculating the center of gravity of the pixels in the region.

The shape criteria may be symmetry and wherein the symmetry is tested by finding a cross section through the region that result in the longest profile in terms of distance from the first pixel encountered to the last pixel encountered and comparing this distance to that obtained when using the perpendicular line to the longest axis.

In one example, the processor controls the mechanical actuator to move the mechanical actuator such that the sequence of points is divided into several sets, each set containing at least 3 points in a plane and at least one point out of the plane defined by the other points.

The precise relative displacements of these points is known by the processor using positional feedback from the mechanical actuator.

For example, each set is created by applying a different 6 degree of freedom translational and rotational offset to the standard untransformed set points to yield a new set of discrete points which have the same relative positions.

According to another example embodiment, a method for calibrating a camera, the method including:
  control a mechanical actuator to move at least one of an energy source and a camera relative to the other through a plurality of discrete points on a calibration target pattern;
  at each of the discrete points, take a digital image with the camera; perform a lens distortion characterisation on each image;
  determine a focal length of the camera including any lens connected to the camera; and
  determine an extrinsic camera position for each image.

DESCRIPTION OF EMBODIMENTS

Figure 1:
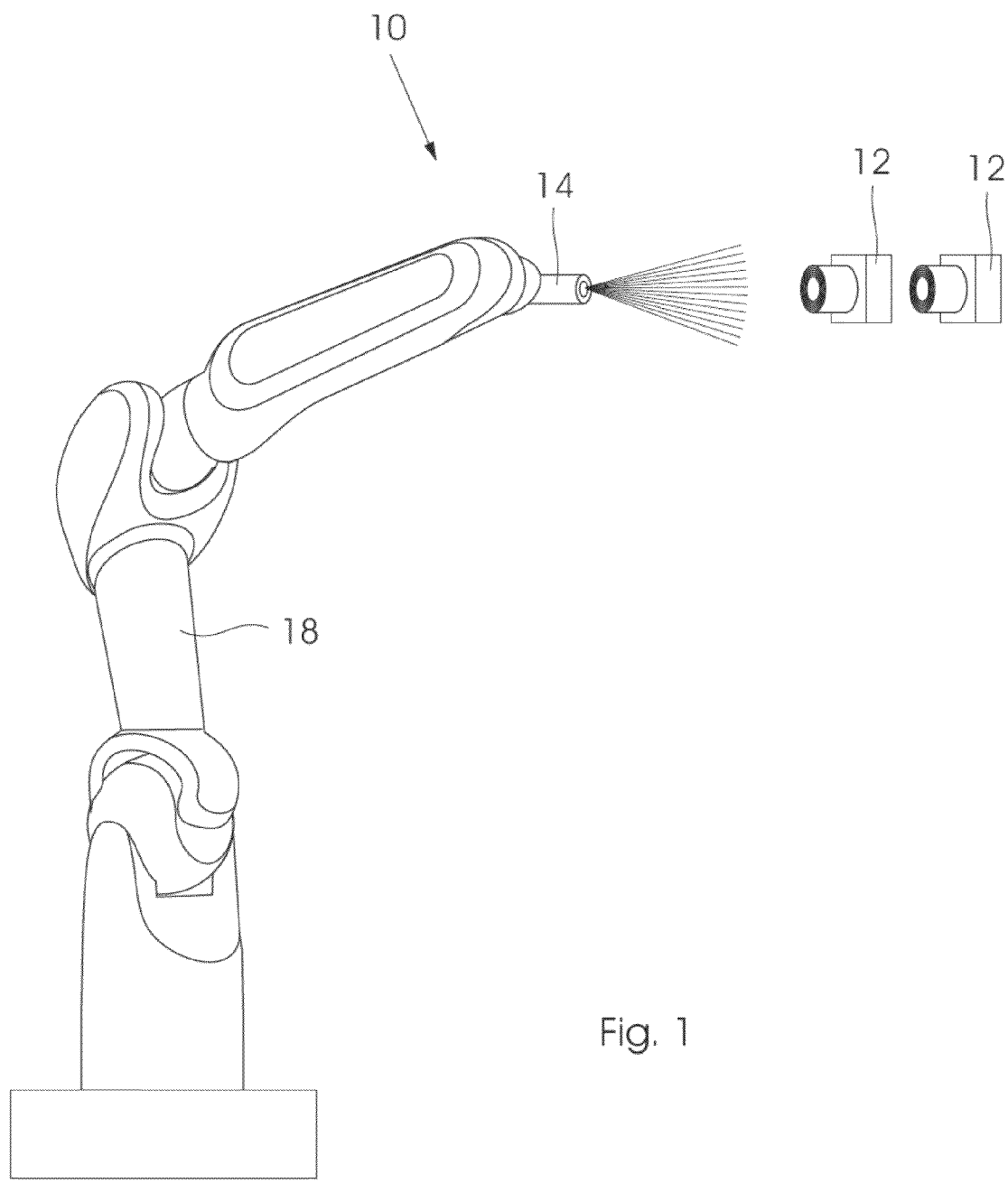
FIG. 1 is an example system for calibrating a digital camera.
Figure 2:
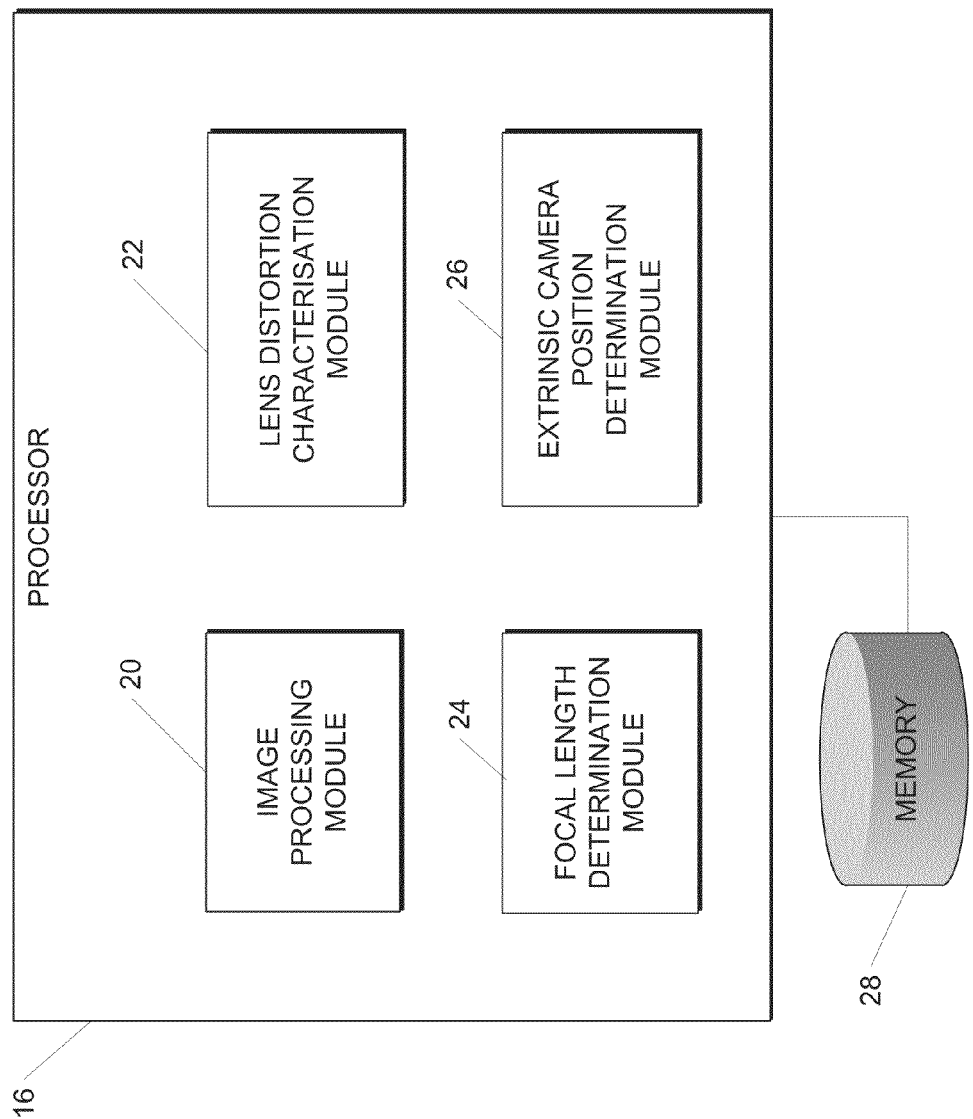
FIG. 2 is a block diagram illustrating a processor of the system of FIG. 1.

The system and methodology described herein relate to a method of calibrating a camera and a system therefor.

The present invention characterises a camera of any (known) sensitivity spectrum, in terms of its intrinsic and extrinsic parameters. The intrinsic parameters are those that affect the projection of observed real-world scene's onto the camera's imaging electronics, these include at least one of the lens distortion parameters, lens focal length, size of the pixels, and orthoganilty of the imaging electronics to the lens' optical axis.

The extrinsic parameters define at least one of where the camera is relative to a reference point and what its orientation is relative to a chosen axis definition.

Referring to the accompanying Figures, the system 10 includes at least one camera 12 and/or at least one energy source 14.

It will be appreciated that a number of cameras 12 and a number of energy sources 14 could be used.

The system also includes a processor 16 connected to the energy source and/or the camera. The processor 16 includes a number of modules whose functionality will be described in more detail below.

In one example embodiment, the modules described below may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

A memory 28 is connected to the processor 16.

In an example embodiment, to perform the above calibrations, a mechanical actuator 18 in the form of a robotic arm is used to move an energy source in the field of view of the camera.

In the illustrated example embodiment the mechanical actuator 18 is movable by servo motors (not shown) under the control of the processor 16.

The position of the robotic arm 18 at any given time is known, and the camera captures images of the energy source.

Each image containing a view of the robotic arm and energy source is captured by the camera and delivered to the processor 16. The camera 12 may have been configured such that the exposure period has been decreased and/or the iris of the lens opened up so that the energy source is visible whilst eliminating most of the background. The algorithms detailed below work regardless of whether this has been done and require only a single image with the energy source visible.

The processor 16 firstly characterizes the lens distortion and then determines the focal length and finally determines the extrinsic positions of the cameras. These steps will be defined in more detail below.

After the digital images have been captured, the image processing steps are performed by an image processing module 20 as follows to implement the above methodologies:

1) Determine which regions of adjacent pixels in the image have an intensity above a chosen threshold value. Generate a list of such regions and the pixels which belong to each region together with the pixels' coordinates and intensities.
2) Remove from this list any regions which have either too few or too many constituent pixels as determined by the characteristics of the camera, lens and energy source.
3) Remove from the list all regions that do not meet shape criteria such as symmetry. Symmetry is tested by finding which cross section through the region results in the longest profile in terms of distance from the first pixel encountered to the last pixel encountered. This distance is compared to that obtained when using the perpendicular line to the longest axis. If the ratio of the two distances is more than a specified delta from unity the region is discarded.
4) The center of the largest remaining region is sought. This center can be found by means such as fitting an ellipse to the region's pixel and using its center, or by calculating the center of gravity of the pixels in the region.

Lens Distortion Characterisation Steps are then implemented by a lens distortion characterisation module 22 of the processor 16 as follows:

1) Rigidly place the camera in such a position that it can observe with no obstruction the robot moving the energy source.
2) Cause the robot to move the energy source in a series of straight lines. While it is suggested that the lines cover the camera's entire field of view, this is not strictly necessary.
3) At several (at least 3) points along each line, obtain (from the camera being characterised) and then process an image of the energy source as described above.
4) Choose a distortion correction model and determine the initial estimate of the parameters for this model which will correct the observed distortion. This work uses an augmented form of the Brown Lens Distortion model, and uses either prior knowledge or a genetic algorithm to yield an initial starting position.
5) Choose a line straightness metric, which measures and quantifies how co-linear the points along each sampled line of Step 2 are. This work fits the least squares error best fit straight line through each of the sampled points for each line. The metric is then the root mean square perpendicular distance of each sampled point from its respective best fit straight line.
6) Using the metric of Step 5. Numerically refine the initial estimated parameters of Step 4 until the lines in the distortion corrected image (as produced by the distortion model and the current set of parameters) are maximally straight. In this work multidimensional non-linear numerical optimisation techniques are used to minimise the metric described in Step 5. Specifically Leapfrog and the Fletcher-Reeves Conjugate Gradient methods are used.

After the above, the focal length determination is implemented by a focal length determination module 24 of the processor 16 as follows:

1) Determine the camera's lens distortion characteristics.
2) Rigidly place the camera in such a position that it has an unobstructed view of the robot arm moving the energy source.
3) Move the robot such that it pauses at a sequence of discrete points. This sequence of points is divided into several sets. Each set contains at least 3 points in a plane and at least one point out of the plane defined by the other points. The precise relative displacements of these points are known using positional feedback from the robot. Each set is created by applying a different 6 degree of freedom translational and rotational offset to the standard untransformed set points to yield a new set of discrete points which have the same relative positions. For example, in a prototype embodiment, each set of points consist of four points arranged in a tetrahedron. At each of five locations four tetrahedrons were created, angled up-left, up-right, down-left and down-right. This gives a total of 20 tetrahedrons.
4) At each of the discrete points described in step 3, process the camera image as described above to find the coordinate of the energy source.
5) Use the distortion characterisation to find the undistorted pixel position for each captured coordinate yielded by Step 4.

6) Select an initial focal length using either prior knowledge or the manufacturer's claimed nominal focal length.
7) Using the algorithms described in the RANSAC paper (Martin A. Fischler and Robert C. Bolles. 1981. Random sample consensus: a paradigm for model fitting with applications to image analysis and automated cartography. Commun. ACM 24, 6 (June 1981), 381-395. DOI=10.1145358669.358692 http://doi.acm.org/10.1145/358669.358692) or Kieper's paper (L. Kneip, D. Scaramuzza, R. Siegwart, "A Novel Parameterization of the Perspective-Three-Point Problem for a Direct Computation of Absolute Camera Position and Orientation", Proc. of The IEEE Conference on Computer Vision and Pattern Recognition (CVPR), Colorado Springs, USA. June 2011) in combination with the assumed focal length; physical pixel sizes; undistorted image coordinates of the energy source at each point in the sequence; and the exact positions of the robot at each point in the sequence to determine the position of the camera relative to each set of points.
8) Determine how tightly clustered the determined 6 degree of freedom camera positions are. The camera positions should theoretically be identical as the camera was rigidly mounted in Step 2. This work uses the sum of standard deviations of each of the 6 degree of freedom positions as the tightness metric. This work further enhanced this sensitivity by observing the sequence of points from two rigid positions and using the sum of standard deviations of the relative position of the cameras, which should of course be constant.
9) Numerically refine the assumed lens focal length until the determined camera points are most tightly packed as determined by the metric of Step 8. This work performs a simple coarse to fine brute force search due to the non-continuous nature of the metric and since it is mono-dimensional.

Next, the extrinsic positions of the cameras are determined by an extrinsic camera position determination module 26 of the processor 16 as follows:
1) Characterise the camera's lens distortion. At least the radial and tangential distortion parameters that are deemed significant are required.
2) Determine the camera's focal length (or add it to the list of unknowns as described below).
3) Rigidly mount the cameras on the desired mechanical platform for the particular application, and rigidly mount the mechanical platform such that the cameras have an unobstructed view of the robot moving the energy source.
4) Move the robot in a sequence of discrete points. Capture images at each discrete point and find the center of the energy source in the camera's image as described earlier. At each point also capture the exact position of the energy source as returned by the robot.
5) Determine an initial estimated position of the camera relative to the robot. This work uses either prior knowledge of the physical set up or a genetic algorithm to do this.
6) Create a bundle of image based vectors. This is done by using the distortion characterisation parameters together with the physical pixel sizes and the focal length. This focal length can either be known apriori or it can be added as the seventh unknown to be determined.
7) Create a bundle of geometry based vectors. These are created by using the assumed 6 degree of freedom position of the camera (Step 5) and the known position of the energy source at each point in the sequence.
8) Choose a metric to measure the similarity of the two bundles of vectors. This work uses the sum of angles between corresponding vectors as the metric.
9) Refine the estimated 6 degree of freedom position of the camera relative to the robot (and the focal length of the camera if not determined apriori) to maximise the similarity of the two bundles of vectors. This work uses either the Fletcher Reeves Conjugate Gradient (Fletcher, R. and Reeves, C., "Function minimization by conjugate gradients," Computer Journal 7, 140-054(1964)) or Leapfrog multi-dimensional non-linear numerical optimisation algorithms (Snyman, J., "An improved version of the original leap-frog dynamic method for unconstrained minimization: Lfop1(b)," Applied Mathematics and Modelling 7, 216-218 (1983)) to do this.
10) If multiple cameras are being calibrated, and if desired, choose one camera or other known point as the reference system for the set of cameras, and express the determined camera positions relative to this point.

The mathematics underlying the above process steps are described below in more detail.

The mathematical notation used below is as follows: A 3D vector, $V_{abc}$, is a vector from point a directed towards point b expressed in terms of its projections on orthogonal coordinate system c's axes. $V_{abc}$ is used when the magnitude of the vector is unknown or unimportant.

$T_{abc}$ represents the translation or displacement of point b relative to point a. $R_{ab}$ is a 3-by-3 Euler rotation matrix expressing the rotation of an orthogonal axis system a relative to (and in terms of its projections on) an orthogonal axis system b. Individual elements of 3 dimensional vectors are referred to as x, y or z whereas 2 dimensional (2D) vector's elements are referred to as horizontal (h) and vertical (v) to avoid confusion.

The relevant modules of the processor 16 carry out the following functional steps on the captured image data:
1.1) Perform a connected components labeling of all pixels brighter than a chosen threshold.
1.2) Discard all components that do not meet size criteria as determined by the energy source type and camera resolution.
1.3) Discard all components that do not meet shape symmetry criteria, i.e. for each connected component as follows:
a) Fit the best fit straight line through each of the pixels of a component:

Equation 1

$$\vec{x} = (A^T A)^{-1} A^T \vec{B} \qquad (1)$$

where:

$$A = \begin{bmatrix} x_0 & 1 \\ x_1 & 1 \\ \vdots & \vdots \\ x_{N-1} & 1 \end{bmatrix}$$

$$\vec{B} = \begin{bmatrix} y_0 \\ y_1 \\ \vdots \\ y_{N-1} \end{bmatrix}$$

$(x_i, y_i) = i$th pixel of the component $N$ = the number of pixels in the component, and $\vec{x} = [m, c]^T$ = the coefficients for the line $y = mx + c$.

$$L_A = L_{A,max} - L_{A,min} \qquad \text{Equation 2}$$

where:

$$L_{A,max} = \max\left|(\vec{P}_i - [0, c]^T) \cdot \vec{V}_L^n\right|, \forall i$$

$$L_{A,min} = \min\left|(\vec{P}_i - [0, c]^T) \cdot \vec{V}_L^n\right|, \forall i$$

$$\vec{V}_L^n = \frac{\vec{V}_L}{\|\vec{V}_L\|}$$

$$\vec{V}_L = [1, m]^T$$

$$i \in (0, N-1)$$

$N$ = the number of pixels, and $m, c$ = as defined in Eq 1.

$$L_A = L_{A,max} - L_{A,min}$$

where:

$$L_{A,max} = \max\left|(\vec{P}_i - [0, c]^T) \cdot \vec{V}_L^n\right|, \forall i$$

$$L_{A,min} = \min\left|(\vec{P}_i - [0, c]^T) \cdot \vec{V}_L^n\right|, \forall i$$

$$\vec{V}_L^n = \frac{\vec{V}_L}{\|\vec{V}_L\|}$$

$$\vec{V}_L = [1, m]^T$$

$$i \in (0, N-1)$$

$N$ = the number of pixels, and $m, c$ = as defined in Eq 1.

c) Determine the width of the component perpendicular to the best fit line.

$$L_P = L_{P,max} - L_{P,min} \qquad \text{Equation 3}$$

where:

$$L_{P,max} = \max\left|(\vec{P}_i - [0, c]^T) \cdot \vec{V}_P^n\right|, \forall i$$

$$L_{P,min} = \min\left|(\vec{P}_i - [0, c]^T) \cdot \vec{V}_P^n\right|, \forall i$$

$$\vec{V}_P^n = \frac{\vec{V}_P}{\|\vec{V}_P\|}$$

$$\vec{V}_P = \begin{bmatrix} 1 \\ -\frac{1}{m} \end{bmatrix}$$

$$i \in (0, N-1)$$

$N$ = the number of pixels, and $m, c$ = as defined in Eq 1.

$$L_P = L_{P,max} - L_{P,min}$$

where:

$$L_{P,max} = \max\left|(\vec{P}_i - [0, c]^T) \cdot \vec{V}_P^n\right|, \forall i$$

$$L_{P,min} = \min\left|(\vec{P}_i - [0, c]^T) \cdot \vec{V}_P^n\right|, \forall i$$

$$\vec{V}_P^n = \frac{\vec{V}_P}{\|\vec{V}_P\|}$$

$$\vec{V}_P = \begin{bmatrix} 1 \\ -\frac{1}{m} \end{bmatrix}$$

$$i \in (0, N-1)$$

$N$ = the number of pixels, and $m, c$ = as defined in Eq 1.

Next the processor compares the ratio of length ($L_A$) to width ($L_P$) and discards if it is not within specified criteria.

1.4) The center of each component is determined using an appropriate technique such as the two listed below for illustrative purposes:

a) Center of gravity $$X_{COG} = \frac{\sum_{i=0}^{N-1} I(x_i, y_i) \times x_i}{\sum_{i=0}^{N-1} I(x_i, y_i)} \qquad \text{Equation 4}$$

$$Y_{COG} = \frac{\sum_{i=0}^{N-1} I(x_i, y_i) \times y_i}{\sum_{i=0}^{N-1} I(x_i, y_i)}$$

$I(x_i, y_i)$ = intensity of pixel located at $(x, y)$, $(x_i, y_i)$ = coordinates of the component's $i$th pixel, $i \in (0, N-1)$, and $N$ = number of pixels in the component.

b) Fitting an eclipse by (e.g.) minimising the following metric:

$$\text{metric} = c_0 \pi a b + c_1 (CS - ES) + c_2 (WS - 2ES) \qquad \text{Equation 5}$$

where $c_n$ = the $n$th weighting term, $CS$ = sum of intensities from centroid calculation, $$WS = \sum_{h,v \in W} I(h, v),$$

$I(h, v)$ = image intensity at 2D coordinate $(h, v)$, $$ES = \sum_{h,v \in W} \begin{cases} I(h, v) & \text{if } CR \leq ER, \\ \alpha I(h, v) & \text{if } ER < CR \leq ER + 1, \\ 0 & \text{if } CR > ER + 1, \end{cases}$$

$$CR = \|\langle h, v \rangle - \langle E_h, E_v \rangle\|$$

$$ER = \sqrt{\frac{a^2 b^2}{(b\cos(\theta))^2 + (a\sin(\theta))^2}}$$

$\alpha = (1 - (CR - ER))$ $W = h \in (E_h - (a+3), E_h + (a+3))$, $v \in (E_v - (a+3), E_v + (a+3))$ $(E_h, E_v)$ = centre of ellipse, $a$ = major axis of ellipse, $b$ = minor axis of ellipse, $\theta$ = angle of major axis from horizontal.

Lens Distortion Characterisation

For lens distortion characterisation the fact that straight lines in the real world must project onto straight lines in the image space after distortion has been corrected is used. To do this the robot (and its attached energy source) is moved in a series of straight lines, stopping at several points along each line for an image to be captured. This results in N lines being captured each of which has $M_i$, $i \in (0, N-1)$ points. These points are referred to as $P_{i,j}^d$ indicating the original raw (i.e. distorted) image position of the jth point of the ith line.

Thereafter an arbitrary number of parameters for the Brown Lens distortion model (Brown DC (1966). "Decentering distortion of lenses.". Photogrammetric Engineering. 7: 444-462) can be numerically determined.

Any multi-dimensional numerical optimisation routine can be used, although some perform worse due to their mathematical mechanics and the highly correlated nature of the parameters and residual noise inherent in the measurement of the input data.

In a prototype of the present invention, an augmented version on Brown's model is used whereby a radial gain scale factor is applied to the radial distortion parameters to facilitate variation that could be induced by either non-orthogonality of the lens to the optical axis or other manufacturing defects. This does not affect the generality of this work as $f(\theta)=1$ corresponds to the standard case published in literature. Without loss of generality we will assume, for illustrative purposes, that $f(\theta)$ is of the form: $f(\theta)=\gamma_1+\gamma_2 \sin(\theta-\gamma_3)$.

$$x_u = x_d + f(\theta)(x_d - x_c)(K_1 r^2 + K_2 r^4 + \ldots) + \\ (P_1(r^2 + 2(x_d - x_c)^2) + 2P_2(x_d - x_c)(y_d - y_c)) \times \\ (1 + P_3 r^2 + \ldots)$$

$$y_u = y_d + f(\theta)(y_d - y_c)(K_1 r^2 + K_2 r^4 + \ldots) + \\ (2P_1(x_d - x_c)(y_d - y_c) + P_2(r^2 + 2(y_d - y_c)^2)) \times \\ (1 + P_3 r^2 + \ldots))$$

Equation 6 where:
$(x_u, y_u)$ = undistorted image point,
$(x_d, y_d)$ = distorted image point,
$(x_c, y_c)$ = centre of distortion,
$K_n = N^{th}$ radial distortion coefficient,
$P_n = N^{th}$ tangential distortion coefficient,
$\theta = \tan^{-1}\left(\frac{y_d - y_c}{x_d - x_c}\right)$
$f(\theta)$ = the radial gain,
$r = \sqrt{(x_d - x_c)^2 + (y_d - y_c)^2}$,
and ... = an infinite series.

A metric is used to measure how straight a set of lines is, this metric determines the best fit straight line through each captured straight line's points (see Eq. 1) and then determines the RMS distance of the points from their straight lines. The procedure used to determine the best fit straight line is given in Eq. 1. This metric is:

$$\text{metric} = \sqrt{\frac{1}{\sum_{n=0}^{n<N_L} M_n} \sum_{n=0}^{n<N_L} \sum_{m=0}^{m<M_n} \left(\left(\vec{P}_{n,m}^u - [0, c_n]^T\right) \cdot \vec{d}_n\right)^2}$$

Equation 7 where
$N_L$ = the number of straight lines in the data captured,
$M_n$ = the number of points along the nth line,
$\vec{d}_n$ = unit direction vector orthogonal to the RMS line $n$,
$= \frac{[1, m]^T}{\|[1, m]\|}$
$m_n, c_n$ = coefficient of best fit line $n$ as per Eq. 1, and
$\vec{P}_{n,m}^u$ = the undistorted point in question.

The following steps are then performed in order to determine the residual distortion resulting from a given set of parameters:

2.1) Scale the received parameters from gradient desensitized space:
$x_c = k_{xc} x_c^n$
$y_c = k_{yc} y_c^n$
$K_i = K_{Ki} K_i^n, \forall i \in (1, N_K)$
$P_i = K_{Pi} P_i^n, \forall i \in (1, N_P)$
$\gamma_i = K_{\gamma i} \gamma_i^n, \forall i \in (1, N_\gamma)$ where:
$N_K$ = the number of radial parameters,
$N_P$ = the number of tangential parameters,
$N_\gamma$ = the number of asymmetry parameters,
$(k_{xc}, k_{yc})$ = distortion center scaling parameters,
$k_{Ki}$ = scale factor for ith radial parameter,
$k_{Pi}$ = scale factor for ith tangential parameter,
$k_{\gamma i}$ = scale factor for ith asymmetry parameter,
$(x_c^n, y_c^n)$ = received normalised distortion center,
$K_i^n$ = received normalised radial parameter,
$P_i^n$ = received normalised tangential parameter, and
$\gamma_i^n$ = received normalised asymmetry parameter.

Equation 8

2.2) Use the scaled parameters and to undistort each point of every line captured for undistortion, i.e.

$$\vec{P}_{i,j}^U = F_{undist}(\vec{P}_{i,j}^D, x_c, y_c, K_1 \ldots K_{N_K}, P_1 \ldots P_{N_P}, \gamma_1 \ldots \gamma_{N_\gamma}), \forall i \in (0, N_L-1), \forall j \in (0, M_n-1)$$

where:
$F_{undist}$ = the augmented Brown model given in Eq. 6.

Equation 9

2.3) Use Eq. 1 to determine the best fit line through the undistorted points of each line in the input dataset.

2.4) Use Eq. 7 to determine the RMS perpendicular distance of the points from their lines.

The procedure for numerical optimisation of the distortion characterisation parameters is given below.

A numerical optimisation of distortion characterisation parameters is then calculated by the processor 16 as follows:

3.1) Decide which parameters are going to be optimised. That is: choose the number of radial and tangential distortion parameters; whether the image center is used or if optimal distortion center will be found; and select a radial gain function.

3.2) Select a starting value for each parameter. Three common ways of doing this are:
a) Set all the parameters to 0
b) Use prior knowledge to select approximate starting values
c) Specify a range for each parameter and perform a coarse global optimisation, such as brute force or a genetic algorithm.

3.3) Scale each of the input parameters, so that the gradient is equally sensitive to a constant size perturbation in each dimension. This allows for a more accurate gradient estimation by the local optimisation procedure resulting in better characterisations. With reference to Eq. 8, Eq 10 shows the scaling procedure $x_c^n = x_c^s / k_{xc}$
$y_c^n = y_c^s / k_{yc}$
$K_i^n = K_i^s / k_{Ki}, \forall i \in (1, N_K)$
$P_i^n = P_i^s / k_{Pi}, \forall i \in (1, N_P)$
$\gamma_i^n = \gamma_i^s / k_{\gamma i}, \forall i \in (1, N_\gamma)$ where:
($x_c^s$, $y_c^s$) = starting distortion center values,
$K_i^s$ = starting radial correction parameter values,
$P_i^s$ = starting tangential correction parameter values, and
$\gamma_i^s$ = starting asymmetry correction parameter values.

Equation 10

3.4) Use a local optimisation routine to numerically refine the normalised starting parameters given in Eq. 10, the value to be minimised is specified in Algorithm 2. Specifically Leapfrog and Fletcher-Reeves are used in this work to perform the minimisation.

3.5) Denormalise the returned distortion characterisation values using Eq. 8.

Focal Length Determination

The processor 16 determines the focal parameters, without adding the extrinsic parameters to the bundle of parameters to be numerically refined.

Determining the focal length simultaneously with the extrinsic parameters will be described below. Performing the focal length determination independently decreases the dimensionality of the extrinsic parameter determination and removes the ambiguity that prevents the focal length being determinable when orthogonally viewing a planar pattern (or sequence of robot movements in a plane).

A. The Tetrahedron Perspective Problem

This calibration makes use of the three point perspective problem which is formally stated in RANSAC paper and KIEPER'S paper (both referenced above) and restated here in words for explanatory purposed. When a camera views three points that have known distances between them, the orientation and the translation of the camera relative to the three points can be solved analytically.

This is done by calculating unit direction vectors from vectors from the camera to each of the points (see Eq. 20) and then calculating the angle between these direction vectors (via the vector dot product).

The cosine rule given in Eq. 11 is the generalisation of Pythagorus' theorem to non-right angled triangles.

$$a^2 = b^2 + c^2 - 2bc \cos(\theta_a)$$

where:
a, b, c = the lengths of the sides of a triangle, and
$\theta_a$ = the angle opposite side a.

Equation 11

Using the cosine rule, and recalling that the dot product of two vectors is equal to the cosine of the angle between them, one can set up a series of simultaneous equations expressing the three unknown lengths of the vectors from the camera to each viewing point, in terms of the unit vectors from the camera to the points and the known distances between the points of the triangle as follows:

$$L_{1,2} + L_{c,1}^2 + L_{c,2}^2 - 2L_{c,1}L_{c,2}(\vec{U}_{c1c} \cdot \vec{U}_{c2c})$$

$$L_{2,3} + L_{c,2}^2 + L_{c,3}^2 - 2L_{c,2}L_{c,3}(\vec{U}_{c2c} \cdot \vec{U}_{c3c})$$

$$L_{1,3} + L_{c,1}^2 + L_{c,3}^2 - 2L_{c,1}L_{c,3}(\vec{U}_{c1c} \cdot \vec{U}_{c3c})$$

where:
$L_{i,j}$ = the distance between points i and j of the triangle $\forall i, j \in [1,3]$,
$L_{c,i}$ = the distance between the camera and point i of the triangle $\forall i \in [1,3]$,
$\vec{U}_{icc}$ = the unit vector pointing from the camera to point i of the triangle; as determined by Eq.20.

Equation 12

Eq. 12 has four sets of solutions (the determination of which is given in RANSAC paper and KIEPERS paper (both referenced above), although not all solutions are purely real on the complex plane. In order to select which solution is the correct one, a fourth point which is out of the plane of the first three points and whose translation relative to the other point is known, is required. The four points then constitute a tetrahedron, with the fourth point at the apex. For each real solution the position of the camera relative to the triangle of points (i.e. the base of the tetrahedron) is calculated, and then the position of the fourth point relative to the camera is calculated. The vector to this calculated position of the fourth point is compared to the vector calculated from the image coordinates of the fourth point, and the solution that has the smallest angle between these two vectors is selected as the correct solution.

This entire procedure is summarised in Eq. 13 below.

$$(\vec{T}_{tct}, R_{ct}) = f_t(\vec{U}_{c1c}, \vec{U}_{c2c}, \vec{U}_{c3c}, \vec{U}_{c4c}, \vec{T}_{t1t}, \vec{T}_{t2t}, \vec{T}_{t3t}, \vec{T}_{t4t})$$

where:
$f_t$ = the procedures described earlier in this section,
$\vec{T}_{tct}$ = the translation of the camera relative to the tetrahedron in the tetrahedron's axis system,
$R_{ct}$ = the Euler rotation matrix of the cameras axis system relative to the tetrahedron's,
$\vec{U}_{cic}$ = the unit vector pointing from the camera to point i of the tetrahedron, as per Eq.20, and
$\vec{T}_{tit}$ = the translation of the ith point of the tetrahedron in its axis system.

Equation 13

Focal length determination makes use of the tetrahedron problem detailed above and summarised in Eq. 13. Note that Eq. 13 makes use of Eq. 20 below which is dependent on the distortion parameters of the lens which are assumed to have already been calibrated via the methods described in algorithm 3 and the focal length which is the subject of this characterisation.

The robot is used to place the energy source in the field of view of the camera in a number of positions such that a number of tetrahedrons are created. In the exemplary embodiment 20 tetrahedrons were created in four groups of five. Each group had the tetrahedron centered located at a different location, with the groups' central positions forming a '+'. At each location the tetrahedrons were angularly offset such that the camera's optical axis was not normal to the base of the tetrahedron. The tetrahedrons in a group were respectively angled to look up-to-the-right, down-to-the-right, down-to-the-left, and up-to-the-left as seen from the camera's point of view.

To determine the focal length the camera was placed in two positions to view the tetrahedrons. The camera was rigidly placed in the first position and then viewed all the tetrahedrons, after which it was placed in the second position and it again viewed the robot moving through the exact same tetrahedrons. The camera was stationary at each position while viewing the tetrahedrons. This means that the relative displacement of the camera was constant. Since the robot was used to move the energy source to each subsequent position for each tetrahedron, the translations of the tetrahedron points are known. If the distortion parameters are already known then the focal length remains the only parameter required by Eq. 13.

For an assumed focal length the position and orientation of the camera relative to the robot reference (which is the axis system in which the energy source's translations (i.e. the $T_{icc}$'s of Eq. 13) are known) can be calculated.

At the correct focal length the locus of calculated camera positions will be the smallest. This in itself can be used as a metric to determine the ideal focal length, however this sensitivity to focal length is increased by comparing the relative position and orientation of the camera at the second position compared to the camera at the first position for each tetrahedron. This is possible due to the high repeatability of the robots used (in the exemplary embodiment and ABB IRB120). The variation in the relative positions is the metric that is minimised. The calculation of this metric is given in Algorithm 4 below.

The variation of the camera relative to 6 degree of freedom positions for a tetrahedron set and focal length is calculated next by the processor as follows:

4.1) Calculate the unit vectors from the processed images of the energy source, the distortion parameters, and the specified focal length as described in Eq. 20:

$$\vec{U}_{c_{a,j}ic_{a,j}} = f_{UV}(\vec{T}_{a,i,j}^d, \text{Distortion\_Parameters}, \text{Focal\_Len})$$

$$\vec{U}_{c_{b,j}ic_{b,j}} = f_{UV}(\vec{T}_{b,i,j}^d, \text{Distortion\_Parameters}, \text{Focal\_Len})$$

where:
- $i \in [1, 4]$ and denotes the number of the vertex in the tetrahedron,
- $j \in [1, N_{tet}]$ and denotes the tetrahedron number.
- $N_{tet}$ = the number of tetrahedrons captured
- $f_{UV}$ = creates a unit vector from an image coordinate and intrinsic camera parameters (i.e. Eq. 20),
- $\vec{T}_{x,i,j}^d$ = the image coordinates of the captured center of the energy source with the robot arm at vertex i of tetrahedron j as viewed from camera portion x, and
- $\vec{U}_{c_{x,j}ic_{x,j}}$ = the unit vector from the camera at position x towards the its vertex of tetrahedron j.

Equation 14

4.2) Calculate the position of the camera at each position for all the tetrahedrons (note that the robot reference is used as the tetrahedron axis ∴ $\vec{T}_{t,xr} = \vec{T}_{rxr}$):

$$(\vec{T}_{rc_{a,j}r}, R_{c_{a,j}r}) = f_t(\vec{U}_{c_{b,j}ic_{b,j}} \forall j \in [1,4], \vec{T}_{t,j,r} \forall j \in [1,4])$$

$$(\vec{T}_{rc_{b,j}r}, R_{c_{b,j}r}) = f_t(\vec{U}_{c_{b,j}ic_{b,j}} \forall j \in [1,4], \vec{T}_{t,j,r} \forall j \in [1,4])$$

where:
- $\vec{T}_{t,j,r}$ = translation of vertex i of tetrahedron j expressed relative to the robot reference,
- $\vec{T}_{rc_{x,j}r}$ = translation of the camera at position x expressed relative to the robot reference as calculated using tetrahedron and
- $R_{c_{a,j}r}$ = orientation of the camera at position x expressed relative to the robot reference as calculated using tetrahedron i.

Equation 15

4.3) For each tetrahedron, calculate the position of camera at position b relative to camera at position a $$R_{c_{b,j}c_{a,i}} = R_{c_{a,j}r}^T R_{c_{b,j}r}$$

$$\vec{T}_{c_{b,j}c_{a,j}r} = \vec{T}_{rc_{b,j}r} - \vec{T}_{rc_{a,j}r}$$

where
- $R_{c_{b,j}c_{a,j}}$ = the orientation of the camera at position b relative to the orientation at position a, calculated using tetrahedron i, and
- $\vec{T}_{c_{b,j}c_{a,j}}$ = the translation of the camera at position b relative to the translation at position a, calculated using tetrahedron i.

Equation 16

4.4) Iterate over the results and extract the yaw pitch and roll angles from the Euler rotation matrices of the relative orientations of the camera in the two positions. (i.e. from $Rc_{b;i}c_{a;i}$).

4.5) Calculate the standard deviation of the X ordinate of the relative translation of the cameras as calculated over all the tetrahedron. Repeat for the Y ordinate, the Z ordinate and the yaw, pitch and roll positions just calculated.

4.6) Calculate a weighted sum of the standard deviations to use as the metric:

$$\text{metric} = K_0 X_{stddev} + K_1 Y_{stddev} + K_2 Z_{stddev} + K_3 Yaw_{stddev} + K_4 \text{Pitch}_{stddev} + K_5 \text{Roll}_{stddev}$$

where:
- $K_n$ = the nth weighting coefficient.

Equation 17

In the exemplary embodiment weighting values for Eq. 17 of $K_0 = K_1 = K_2 = 1:0$ and $K_3 = K_4 = K_5 = 10:0$ were used.

In order to find the ideal focal length a range centered around the lens's claimeddesigned focal length needs to be searched for the minimum value of Eq. 17. This can take the form of any line search technique such as Powell's method and Newton's method for finding zero crossings of the derivative. As the metric was seen to be non-continuous and is one-dimensional, the exemplary embodiment consists of a coarse-to-fine brute force search.

Extrinsic Parameter Determination

The 6 degree of freedom position of the camera relative to the robot, the focal length (if not determined as in Section VI) and the optical intersection pixel position (also known as the principal point) are required. In order to do this either of the metrics expressed in Eq 18 or Eq 19 may be numerically optimized using a robust algorithm such as Fletcher-Reeves or Leapfrog (both referenced above). The first metric is slower but more accurate due to the increased sensitivity to almost-parallel vectors provided by the (computationally intensive) inverse cosine function.

$$\text{Metric} = \sum_{i=0}^{n-1} \left( \cos^{-1}\left( \vec{U}_{cic}^1 \cdot \vec{U}_{cic}^2 \right) \right)$$

$$\text{Metric} = \sum_{i=0}^{n-1} \left( 1.0 - \vec{U}_{cic}^1 \cdot \vec{U}_{cic}^2 \right)$$

Equations 18 and 19

The metrics are a comparison between two bundles of vectors. Eq 20 below shows how one of the vector bundles can be generated from the images of the energy source mounted on the robot, once the images have been processed as described in Section IV, and then undistorted using Eq 6 and the final distortion characterisation parameters determined in Section V. The pixel dimensions are assumed known from the data sheet, thus leaving the focal length (potential) and optical axis intersection point as the only unknowns. Good initial guesses for the numerical optimization are the manufacturer's claimed focal length and the distortion centre respectively.

$$\vec{I}_i^u f^{undistort}(\vec{I}_i^d) \quad \text{Equation 20}$$

$$\vec{V}_{cic} = \begin{bmatrix} \text{Focal\_Len} \\ (PP_h - I_{i_h}^u)\text{pix\_w} \\ (PP_v - I_{i_v}^u)\text{pix\_h} \end{bmatrix}$$

$$U_{cic}^1 = V_{cic}/\|V_{cic}\|$$

where:

$\vec{I}_i^d$ = the 2D image pixel position of energy source at position $i$, $f^{undistort}$ = the predetermined lens undistortion characterization function, $PP$ = the optical axis intersection pixel position, pix_w = the width of the pixels on the camera's imager, pix_h = the height of the pixels on the camera's imager, Focal_Len = the exact focal length of the camera's lens, and $U_{icc}^1$ = a unit vector pointing from the camera to position $i$.

The second vector bundle is calculated via Eq 21. It is assumed that the position of the energy source ($\vec{T}_{rir}$) at each robot position is known. Thereafter the unknown spatial offset of the robot reference ($\vec{T}_{crc}$) and the (also unknown) Euler rotation of the robot reference relative to the camera ($R_{rc}$) are used to determine and then normalize a vector to each energy source position. Also note that there is a singularity in both metrics if a planar optical reference jig is used and is placed perpendicular to the camera's optical axis.

$$\vec{T}_{cic} = R_{rc}\vec{T}_{rir} + \vec{T}_{crc}$$

$$\vec{U}_{cic}^2 = \vec{T}_{cic}/\|\vec{T}_{icc}\|$$

where:

$\vec{T}_{crc}$ = the spatial position of the robot reference relative to the camera, $\vec{T}_{rir}$ = the spatial offset of the energy source relative to the robot reference, $R_{rc}$ = the Euler rotation matrix of the robot reference relative to the camera, and $\vec{U}_{cic}^2$ = unit vector pointing from the camera to energy source at position $i$.

Equation 21

The following algorithm explains how to find the extrinsic parameters given a corresponding set of positions of the energy source obtained from the robot ($\vec{T}_{rir}$) and the pixel coordinates of where the energy source is in the camera's image ($\vec{T}_i^d$) as obtained by the methods described in algorithm 3. It is assumed that the distortion characterisation has already been determined as described above.

A determination of the camera extrinsic parameters is now completed by the processor as follows:

5.1) Choose the starting values for the nine parameters being optimised. For the focal length the claimed/designed value is a good starting point, and for the principal point the distortion center is a good starting point. For the three translation and three orientation parameters a crude physical measurement can serve as the starting point. Alternatively a coarse global optimisation technique such as a sparse brute force sampling or (as in the exemplary embodiment) a genetic algorithm can be used to generate the starting values.

5.2) Choose the gradient desensitising scale factors for each of the parameters. The values used in the exemplary embodiment are listed below.

$\gamma_{FLen}$ Focal length scale factor: $10^{-1}$ if the focal length (in min) is being determined, or removed from the optimisation parameter bundle if determined via Algorithm 3.

$\gamma_{PPh}, \gamma_{PPv}$ The principal point horizontal and vertical scale factors, set to $10^2$ if the principal point (in pixels) is being determined, or removed from the parameter bundle if the distortion center is being used.

$\gamma_{Yaw}$ scale factor, set to $10^0$ with the angle expressed in radians.

$\gamma_{Pitch}$ scale factor, set to $10^0$ with the angle expressed in radians.

$\gamma_{Roll}$ Roll scale factor, set to $10^0$ with the angle expressed in radians.

$\gamma_X$ X scale factor, set to $10^{-3}$ with the displacement expressed in mm.

$\gamma_Y$ Y scale factor, set to $10^{-3}$ with the displacement expressed in mm.

$\gamma_Z$ Z scale factor, set to $10^{-3}$ with the displacement expressed in mm.

a) $\gamma_{FLen}$ Focal length scale factor: $10^{-1}$ if the focal length (in mm) is being determined, or removed from the optimisation parameter bundle if determined via Algorithm 3, b) $\gamma_{PPh}, \gamma_{PPv}$ The principal point horizontal and vertical scale factors, set to $10^2$ if the principal point (in pixels) is being determined, or removed from the parameter bundle if the distortion center is being used.

c) $\gamma_{Yaw}$ Yaw scale factor, set to $10^0$ with the angle expressed in radians.

d) $\gamma_{Pitch}$ Pitch scale factor, set to $10^0$ with the angle expressed in radians.

e) $\gamma_{Roll}$ Roll scale factor, set to $10^0$ with the angle expressed in radians, f) $\gamma_X$ X scale factor, set to $10^{-3}$ with the displacement expressed in mm.

g) $\gamma_Y$ Y scale factor, set to $10^{-3}$ with the displacement expressed in mm.

h) $\gamma_Z$ Z scale factor, set to $10^{-3}$ with the displacement expressed in mar.

5.3) Divide each parameter by their corresponding scale factor to produce the normalised parameters (denoted by the superscript n).

5.4) Numerically refine the scaled parameters using the metric described in Algorithm 6. Any non-linear multidimensional numerical local optimisation may be used. The exemplary embodiment makes use of Leapfrog or Fletcher-Reeves (both referenced above).

5.5) Multiply the returned scaled parameters by their corresponding scale factors to yield the position of the robot relative to the camera expressed in the camera's axis ($R_{rc}$) and the translation of the robot relative to the camera expressed in the camera's axis ($\vec{T}_{crc}$)

5.6) Calculate the position of the camera relative to the robot:

$$R_{cr} = R_{rc}{}^T$$

$$\vec{T}_{rcr} = -R_{cr}\vec{T}_{crc}$$

where:
$R_{cr}$=Euler rotation matrix of the camera relative to the robot's reference axis, and
$\vec{T}_{rcr}$=the translation of the camera relative to the robot reference axis, expressed in the robot's reference axis.

$$R_{cr} = R_{cr}{}^T$$

$$\vec{T}_{rcr} = -R_{cr}\vec{T}_{crc}$$

where:
$R_{cr}$=Euler rotation matrix of the camera relative to the robot's reference axis, and
$\vec{T}_{rcr}$=the translation of the camera relative to the robot reference axis, expressed in the robot's reference axis.

Equation 22

An extrinsic parameter refinement metric is now calculated:

6.1) Multiply the received parameters by their corresponding scale factors:

Focal_Len = $\begin{cases} \text{Focal\_Len} & \text{if not part of optimised parameters} \\ \gamma_{FLen}\text{Focal\_Len}^n & \text{if part of optimised parameters} \end{cases}$    Equation 23

$PP_h = \begin{cases} PP_h & \text{if not part of optimised parameters} \\ \gamma_{PPh}PP_h^n & \text{if part of optimised parameters} \end{cases}$ $PP_v = \begin{cases} PP_v & \text{if not part of optimised parameters} \\ \gamma_{PPv}PP_v^n & \text{if part of optimised parameters} \end{cases}$ Yaw = $\gamma_{Yaw}$ Yaw$_n$ Pitch = $\gamma_{Pitch}$ Pitch$_n$ Roll = $\gamma_{Roll}$Roll$_n$ $X = \gamma_X X_n$ $Y = \gamma_X X_n$ $Z = \gamma_Z Z_n$ 6.2) Calculate the Euler rotation matrix of the robot relative to the camera ($R_{rc}$) from the Yaw, Pitch and Roll angles.

6.3) Concatenate the X, Y, and Z values to form the translation of the robot relative to the camera: ($\vec{T}_{crc}$).

6.4) Calculate the image based bundle of unit vectors using Eq. 20, the focal length, the principal point, pixel sizes, distortion correction parameters with Eq. 6 and the set of pixel positions of the energy source centers ($\vec{T}_i^d$). (This need be performed only once if the focal length and principal point are both not part of the optimised parameter bundle).

6.5) Calculate the bundle vectors that are based on the camera position relative to the robot using Eq. 21, the set or positions of the energy source positions in the robot's axis ($\vec{T}_{rir}$), the current estimation of the robots orientation relative to the camera ($R_{rc}$) and the current estimation of the translation of the robot relative to the camera ($\vec{T}_{crc}$).

6.6) Measure the similarity of the two vector bundles using Eq. 18.

It will be appreciated that the method and system described above relate to a process to calibrate a camera and makes use of an exemplary embodiment to do so. The exemplary embodiment is only one possible instantiation of the intellectual property claimed in this patent. Specifically:

1) Making use of a robotic arm to capture points along straight lines to calibrate the distortion parameters of a camera by fitting a lens distortion model to ensure that the straight lines in object space project on to straight lines in image space. The distortion model can include but is not limited to the Brown Lens Distortion Model (referenced above)—with or without a radial gain function, and neural networks.

2) Determining the focal length by minimising the locus of (3 or 6 dimensional) positions of a camera calculated from viewing a three or more planar points and one or more points outside of the plane.

3) Determining the (3 or 6 dimensional) position of a camera by observing a set of images of an energy source as moved by a robot, and comparing a bundle of vectors based on analysis of the images to a second bundle of vectors calculated from a hypothesized (3 or 6 dimensional) position of the camera.

Once the camera has been calibrated the camera can be used find the precise location of an energy source.

The invention claimed is:

1. A system for calibrating a camera, the system including:
an energy source and a camera to be calibrated, with at least one of the energy source and the camera being mounted on a mechanical actuator so that it is movable relative to the other;
a processor connected to the energy source, the mechanical actuator and the camera, the processor programmed to:
control the mechanical actuator to move at least one of the energy source and the camera relative to the other through a plurality of discrete points on a calibration target pattern;
at each of the discrete points, control the camera to take a digital image;
perform a lens distortion characterisation on each image;
determine a focal length of the camera including any lens connected to the camera; and
determine an extrinsic camera position for each image, wherein the processor determines a focal length by:
selecting an initial focal length;
using algorithms in combination with the initial focal length, physical pixel sizes, undistorted image coordinates of the energy source at each point in the sequence, and the exact positions of the mechanical actuator at each point in the sequence to determine the position of the camera relative to each discrete point;
determine how tightly clustered the camera positions are; and
numerically refine the initial focal length until the determined discrete points are most tightly packed.

2. A system according to claim 1, wherein the processor performs the lens distortion characterisation by:
choosing a distortion correction model and determine an initial estimate of parameters for this model to correct an observed distortion;

choosing a line straightness metric, which measures and quantifies co-linear points along a sampled line; and using the line straightness metric and numerically refining the initial estimated parameters until the lines in the distortion corrected image.

3. A system according to claim 1, wherein the processor determines an extrinsic camera position by:
creating a bundle of geometry based vectors; creating a bundle of image processing based vectors;
choosing a metric to measure the similarity of the two bundles of vectors; and
refine an estimated position of the camera relative to the energy source to maximise the similarity of the bundles of vectors.

4. A system according to claim 1, wherein after the digital images have been captured, the processor further performs the following imaging processing steps:
determine which regions of adjacent pixels in an image have an intensity above a chosen threshold value;
generate a list of such regions and the pixels which belong to each region together with the pixels' coordinates and intensities;
remove from this list any regions which have either too few or too many constituent pixels as determined by characteristics of the camera, lens and energy source;
remove from the list all regions that do not meet shape criteria; and
determine a center of the largest remaining region.

5. A system according to claim 4, wherein the processor determines the center by fitting an ellipse to the region's pixel and using its center or by calculating the center of gravity of the pixels in the region.

6. A system according to claim 4, wherein the shape criteria is symmetry.

7. A system according to claim 6, wherein the symmetry is tested by finding a cross section through the region that result in the longest profile in terms of distance from the first pixel encountered to the last pixel encountered and comparing this distance to that obtained when using the perpendicular line to the longest axis.

8. A system according to claim 1, wherein the processor controls the mechanical actuator to move the mechanical actuator such that the sequence of points is divided into several sets, each set containing at least 3 points in a plane and at least one point out of the plane defined by the other points.

9. A system according to claim 8, wherein the precise relative displacements of these points is known by the processor using positional feedback from the mechanical actuator.

10. A system according to claim 8, wherein each set is created by applying a different 6 degree of freedom translational and rotational offset to the standard untransformed set points to yield a new set of discrete points which have the same relative positions.

11. A method for calibrating a camera, the method including:
control a mechanical actuator to move at least one of an energy source and a camera relative to the other through a plurality of discrete points on a calibration target pattern;
at each of the discrete points, take a digital image with the camera;
perform a lens distortion characterisation on each image;
determine a focal length of the camera including any lens connected to the camera; and
determine an extrinsic camera position for each image, wherein a focal length is determined by:
selecting an initial focal length;
using algorithms in combination with the initial focal length, physical pixel sizes, undistorted image coordinates of the energy source at each point in the sequence, and the exact positions of the mechanical actuator at each point in the sequence to determine the position of the camera relative to each discrete point;
determine how tightly clustered the camera positions are; and
numerically refine the initial focal length until the determined discrete points are most tightly packed.

12. A method according to claim 11, wherein the lens distortion characterisation is performed by:
choosing a distortion correction model and determine an initial estimate of parameters for this model to correct an observed distortion;
choosing a line straightness metric, which measures and quantifies co-linear points along a sampled line; and
using the line straightness metric and numerically refining the initial estimated parameters until the lines in the distortion corrected image.

13. A method according to claim 11, wherein the extrinsic camera position is determined by:
creating a bundle of geometry based vectors;
creating a bundle of image processing based vectors;
choosing a metric to measure the similarity of the two bundles of vectors; and
refine an estimated position of the camera relative to the energy source to maximise the similarity of the bundles of vectors.

14. A method according to claim 13, wherein after the digital images have been captured, the method further includes performing the following imaging processing steps:
determine which regions of adjacent pixels in an image have an intensity above a chosen threshold value;
generate a list of such regions and the pixels which belong to each region together with the pixels' coordinates and intensities;
remove from this list any regions which have either too few or too many constituent pixels as determined by characteristics of the camera, lens and energy source;
remove from the list all regions that do not meet shape criteria; and
determine a center of the largest remaining region.

15. A method according to claim 14, wherein the center is determined by fitting an ellipse to the region's pixel and using its center or by calculating the center of gravity of the pixels in the region.

16. A method according to claim 14, wherein the shape criteria is symmetry and wherein the symmetry is tested by finding a cross section through the region that result in the longest profile in terms of distance from the first pixel encountered to the last pixel encountered and comparing this distance to that obtained when using the perpendicular line to the longest axis.

17. A method according to claim 11, wherein the mechanical actuator moves such that the sequence of points is divided into several sets, each set containing at least 3 points in a plane and at least one point out of the plane defined by the other points, and wherein the precise relative displacements of these points is known using positional feedback from the mechanical actuator.

18. A method according to claim 17, wherein each set is created by applying a different 6 degree of freedom translational and rotational offset to the standard untransformed set points to yield a new set of discrete points which have the same relative positions.

* * * * *